United States Patent
Hsueh et al.

(10) Patent No.: US 7,385,358 B2
(45) Date of Patent: Jun. 10, 2008

(54) POWER SUPPLY CIRCUIT AND TRANSFORMER THEREOF

(75) Inventors: Ching-Fu Hsueh, Taoyuan County (TW); Cheng-Hsien Chien, Taoyuan County (TW)

(73) Assignee: Darfon Electronics Corp., Taoyuan (TW)

( * ) Notice: Subject to any disclaimer, the term of this patent is extended or adjusted under 35 U.S.C. 154(b) by 0 days.

(21) Appl. No.: 11/840,432

(22) Filed: Aug. 17, 2007

(65) Prior Publication Data

US 2007/0278970 A1 Dec. 6, 2007

Related U.S. Application Data

(62) Division of application No. 11/392,334, filed on Mar. 29, 2006, now Pat. No. 7,274,156.

(30) Foreign Application Priority Data

May 3, 2005 (TW) ............................... 94114295 A

(51) Int. Cl.
*H05B 41/16* (2006.01)
(52) U.S. Cl. ..................... 315/254; 315/278
(58) Field of Classification Search ............ 315/209 R, 315/210, 219, 226, 250, 254, 276, 278, 312
See application file for complete search history.

(56) References Cited

U.S. PATENT DOCUMENTS

| | | | | |
|---|---|---|---|---|
| 4,277,726 A | * | 7/1981 | Burke | 315/98 |
| 4,392,087 A | * | 7/1983 | Zansky | 315/219 |
| 4,398,128 A | * | 8/1983 | Wollank | 315/158 |
| 4,417,181 A | * | 11/1983 | Leale | 315/209 R |
| 4,859,914 A | * | 8/1989 | Summa | 315/354 |
| 5,424,615 A | | 6/1995 | Kang | |
| 5,440,209 A | * | 8/1995 | Nilssen | 315/219 |
| 6,750,619 B2 | * | 6/2004 | Nemirow et al. | 315/291 |
| 6,781,325 B2 | | 8/2004 | Lee | |
| 6,784,627 B2 | | 8/2004 | Suzuki et al. | |
| 7,061,183 B1 | | 6/2006 | Ball | |
| 7,141,933 B2 | | 11/2006 | Ball | |
| 7,173,382 B2 | | 2/2007 | Ball | |
| 7,345,431 B2 | * | 3/2008 | Lee | 315/224 |
| 2004/0046512 A1 | | 3/2004 | Suzuki et al. | |
| 2005/0093472 A1 | | 5/2005 | Jin | |
| 2005/0093482 A1 | | 5/2005 | Ball | |
| 2007/0152608 A1 | | 7/2007 | Lee | |

FOREIGN PATENT DOCUMENTS

TW  1220994  9/2004
TW  200514107  4/2005

* cited by examiner

*Primary Examiner*—Thuy Vinh Tran
(74) *Attorney, Agent, or Firm*—Thomas, Kayden, Horstemeyer & Risley

(57) ABSTRACT

A power supply circuit for a first and a second lamps and the transformer thereof is provided. The power supply circuit comprises a driving circuit and a transformer. The transformer includes a magnetic core, a primary coil set, a secondary coil, a first coil and a second coil. The driving circuit provides an alternative voltage. The primary coil set is wound on the magnetic core, along with the secondary coil, the first and the second coils, and receives the alternative voltage. The turns of the first coil and the second coil are substantially the same. The first lamp is coupled between the first coil and the secondary coil, and the second lamp is coupled between the second coil and the secondary coil.

5 Claims, 12 Drawing Sheets

POWER SUPPLY CIRCUIT AND TRANSFORMER THEREOF

CROSS REFERENCE TO RELATED APPLICATIONS

This application is a division of U.S. application Ser. No. 11/392,334, filed Mar. 29, 2006, which is now U.S. Pat. No. 7,274,156 B2, which claims the benefit of Taiwan application Serial No. 94114295, filed May 3, 2005, the subject matter of which is incorporated herein by reference.

BACKGROUND OF THE INVENTION

1. Field of the Invention

The invention relates in general to power supply circuit for lamp and more particularly to the power supply circuit and its transformer for driving a plurality of lamps and balancing the currents of the lamps.

2. Description of the Related Art

The brightness of the LCD, i.e. LCD TV, has to increase while the screen size thereof is increasing. The backlight module of the LCD provides the higher brightness by increasing the number and size of the lamps, which are cold-cathode fluorescent lamps for example.

FIG. 1 is a diagram of conventional power supply circuit of a plurality of lamps. The power supply circuit 100 is used in a backlight module that provides the light source for LCD. The power supply circuit 100 includes a DC-AC converter 102, a transformer 104 for driving lamps L1 and L2. DC-AC converter provides an alternative voltage to the transformer 104, which in turn boosts up the alternative voltage for driving lamps L1 and L2. The transformer 104 includes a primary coil set 106 and a secondary coil 108.

The currents respectively flowing through the lamps L1 and L2 may not be the same due to the slightly different impedances, which are caused by the different wire impedances and the different lamp characteristics, and thus the brightness of the lamps L1 and L2 may not be the same, such that the image quality of the LCD and the longevity of the lamps would be affected. Therefore, the issue of unbalanced currents while driving multiple lamps is to be solved.

SUMMARY OF THE INVENTION

It is therefore an object of the invention to provide a power supply circuit and the transformer thereof for driving lamps to avoid unbalanced currents.

The invention achieves the above-identified objects by providing a power supply circuit for a first and a second lamps. The power supply circuit comprises a driving circuit and a transformer. The transformer includes a magnetic core, a primary coil set, a secondary coil, a first coil and a second coil. The driving circuit provides an alternative voltage. The primary coil set is wound on the magnetic core, along with the secondary coil, the first and the second coils, and receives the alternative voltage. The turns of the first coil and the second coil are substantially the same. The first lamp is coupled between the first coil and the secondary coil, and the second lamp is coupled between the second coil and the secondary coil.

The invention achieves another object by providing a transformer for driving a first lamp and a second lamp. The transformer includes a magnetic core, a primary coil set, a secondary coil, a first coil and a second coil. The primary coil set is wound on the magnetic core for receiving an alternative voltage. The secondary coil is wound on the magnetic core for driving the lamps. The first coil and the second coil are wound on the magnetic core and the turns thereof being substantially equal. The first lamp is coupled between the secondary coil and the first coil, and the second lamp is coupled between the secondary coil and the second coil.

Other objects, features, and advantages of the invention will become apparent from the following detailed description of the preferred but non-limiting embodiments. The following description is made with reference to the accompanying drawings.

DETAILED DESCRIPTION OF THE INVENTION

First Embodiment

Figure 1:
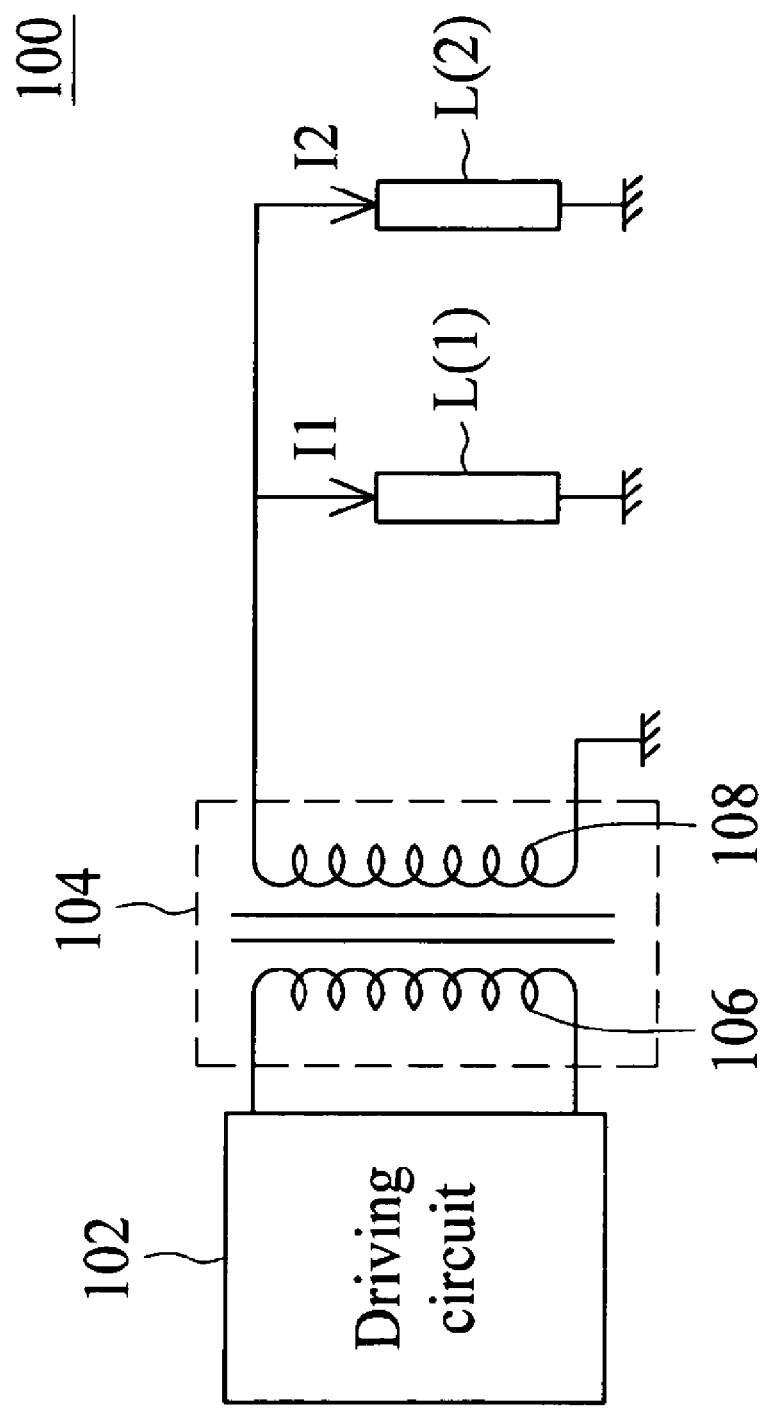
FIG. 1 is a diagram of a conventional power supply circuit for lamps.
Figure 2A:
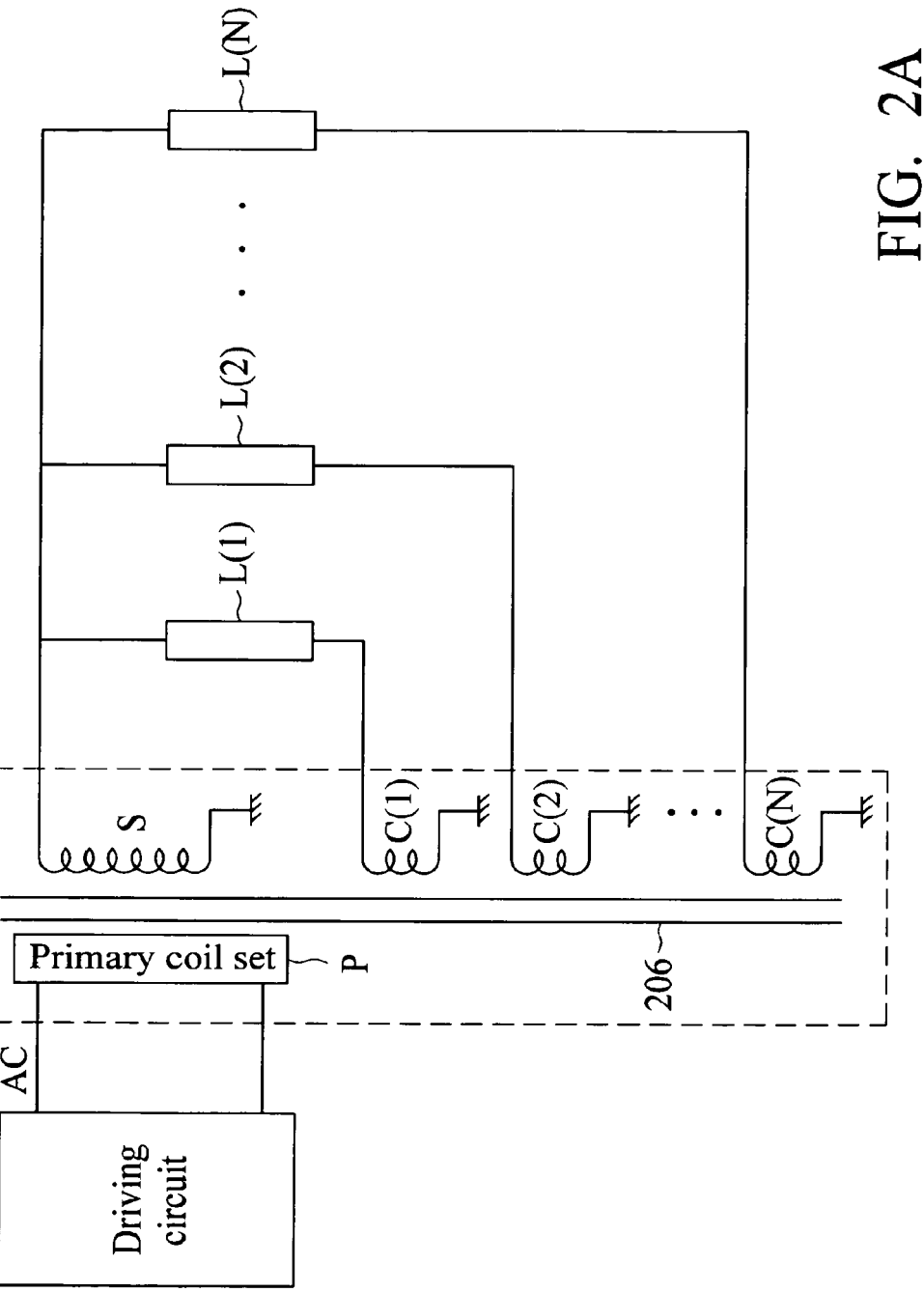
FIG. 2A is a circuit diagram of a power supply circuit according to a first embodiment of the invention.

Referring first to FIG. 2A, it shows a diagram of a power supply circuit for lamps according to a first embodiment of the invention. The power supply circuit 200 is for example used in a backlight module that provides backlight for LCD or LCD TV. The power supply circuit 200 includes a driving circuit 202, a transformer 204 for driving N lamps L(1)-L(N), wherein N is a positive integer. The driving circuit 202 is a DC-AC converter or a AC-AC converter for proving alternative voltage AC.

The transformer 204 includes a primary coil set P, a secondary coil S, N identical coils C(1)-C(N) and a magnetic core 206 for boosting up the alternative voltage AC to drive N lamps L(1)-L(N). The primary coil set P, the secondary coil S and the N coils C(1)-C(N) are wound on the magnetic core 206. The lamps L(1)-L(N) are cold-cathode fluorescent lamps (CCFL) for example, and respectively coupled to the coils C(1)-C(N).

Figure 2B:
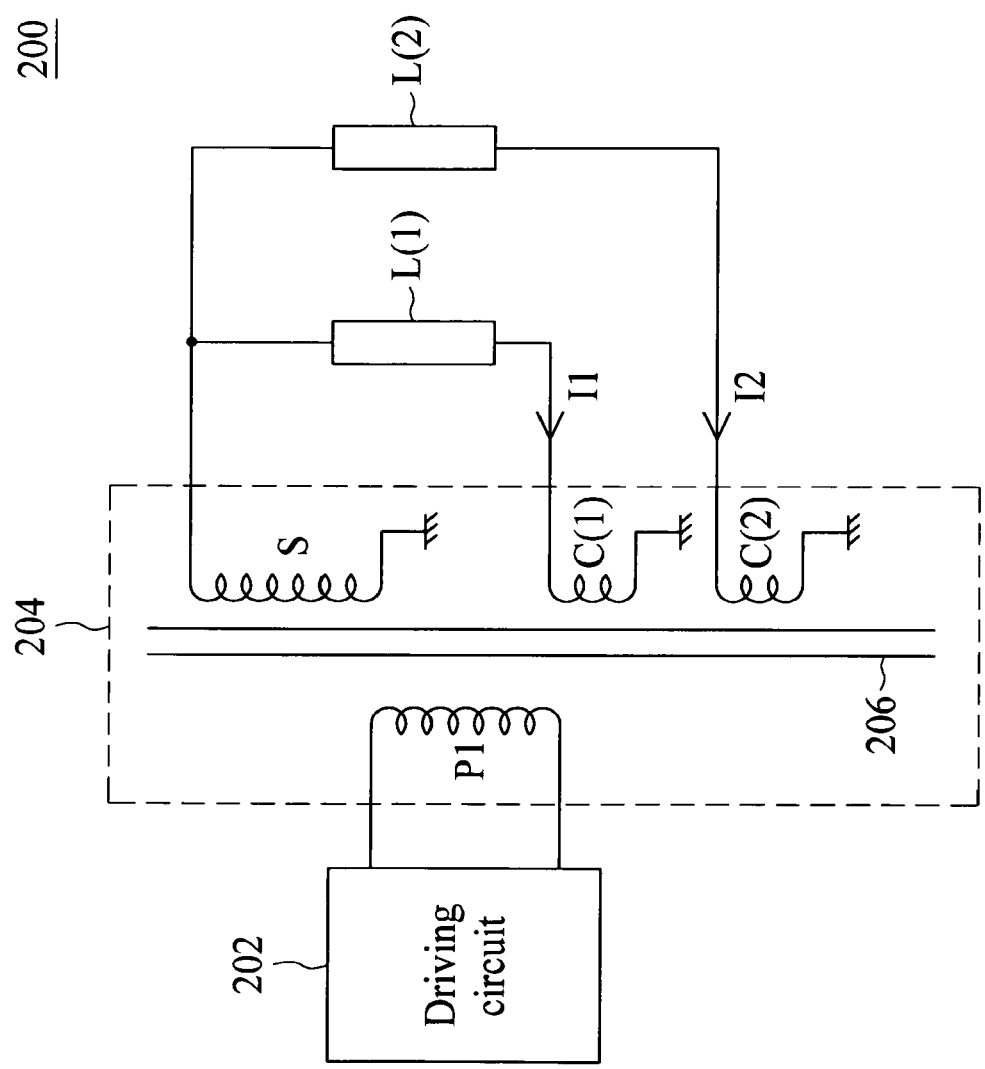
FIG. 2B is a circuit diagram of a power supply circuit of an example I.

FIG. 2B is a circuit diagram of the power supply circuit of an example I. In the example I, let N equals 2, the power supply circuit 200 drives a first lamp L(1) and a second lamp L(2) and the primary coil set P includes a primary coil P1. The primary coil P1 is coupled to the driving circuit 202. An end of the secondary coil S is electrically connected to the both lamps L(1) and L(2). The other end of the lamp L(1) is coupled to the ground via the coil C(1). The other end of the lamp L(2) is coupled to the ground via the coil C(2). While a high alternative voltage is generated by the secondary coil S via the magnetic core 206 for driving the first lamp L(1) and the second lamp L(2), the currents of the first lamp L(1) and the second lamp L(2) would be very close due to the same magnetic fluxes respectively through the coil C(1) and the coil C(2), in which the numbers of turns are the same.

That is, since the first coil C(1) and the second coil C(2) have the same number of turns and the same magnetic fluxes, the current I1 induced by the coil C(1) and current I2 induced by the coil C(2) would be balanced. Therefore, the brightness of the first lamp L(1) would be fairly close to that of the lamp L(2), such that the backlight module can provide backlight evenly. The longevity of the lamps L(1) and L(2) would be lengthened for the balanced currents.

Figure 2C:
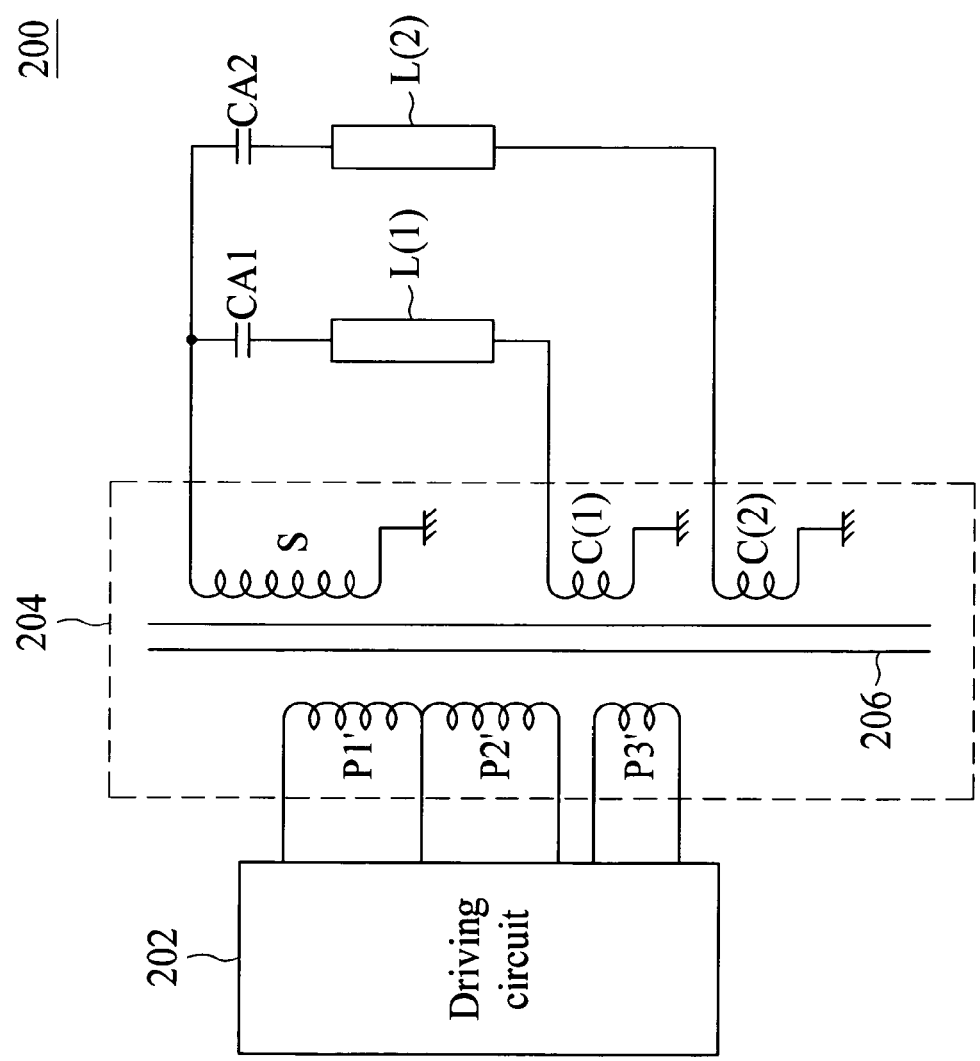
FIG. 2C is a circuit diagram of a power supply circuit of an example II.

Besides, the primary coil set P can have only one coil P1 as described by the example I, or have multiple coils. The combination of the primary coil set P is varied. FIG. 2C is a circuit diagram of the power supply circuit of an example II. In the example II, the primary coil set P includes primary coils P1', P2' and P3', the driving circuit 202 is exemplified by a Royer circuit. The primary coils P1', P2', P3', the secondary coil S and the first coil C(1) and the second coil C(2) are wound on the magnetic core 206.

One end of the secondary coil S couples to the first lamp L(1) and the second lamp L(2) via capacitors CA1 and CA2, respectively. While the second coil S induces a high alternative voltage by the magnetic core 206 for driving lamps L(1) and L(2), the current I1 through the lamp L(1) and the current I2 through the lamp L(2) are closely identical, as the same reason described in the above example, such that the brightness is more evenly and the longevity thereof is lengthened.

Figure 2D:
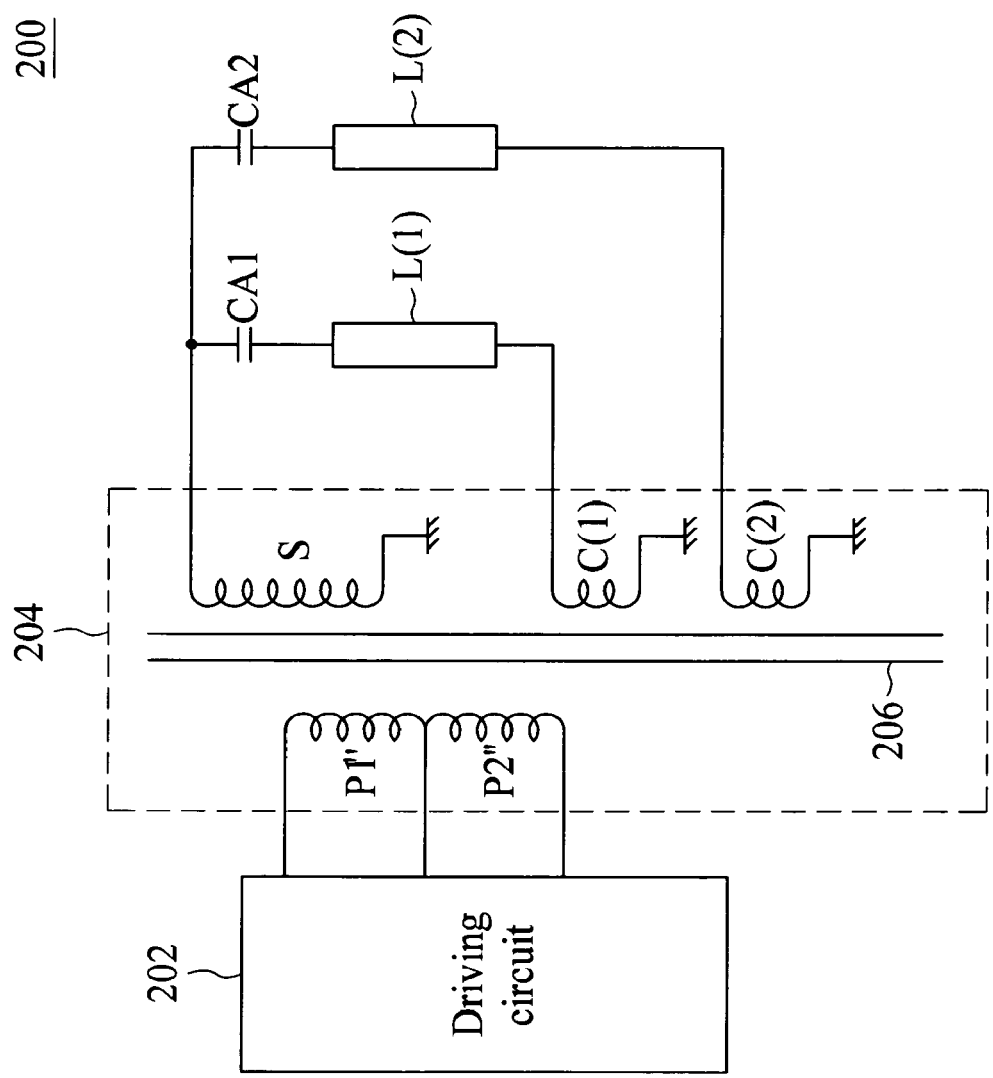
FIG. 2D is a circuit diagram of a power supply circuit of an example III.

FIG. 2D is a circuit diagram of the power supply circuit of an example III. The primary coil set P has two coils, primary coils P1" and P2", and the driving circuit 202 is a push-pull converter or a half-bridge converter. The primary coils P1" and P2", the secondary coil S and coils C(1) and C(2) are wound on the magnetic core 206. One end of the secondary coil S is coupled to the first lamp L(1) and the second lamp L(2) via the capacitors CA1 and CA2. The driving mechanism for balanced currents of the lamps L(1) and L(2) is described above and would not repeat again. Additionally, the capacitors CA1 and CA2 are optional depending on the design request.

While more lamps L are to be driven, only an additional secondary coil S' (not shown in the figure) wound on the magnetic core 206 is needed, instead of a new transformer, such that the number of the transformers is not increased and the cost of the transformer 204 is reduced.

Second Embodiment

Figure 3:
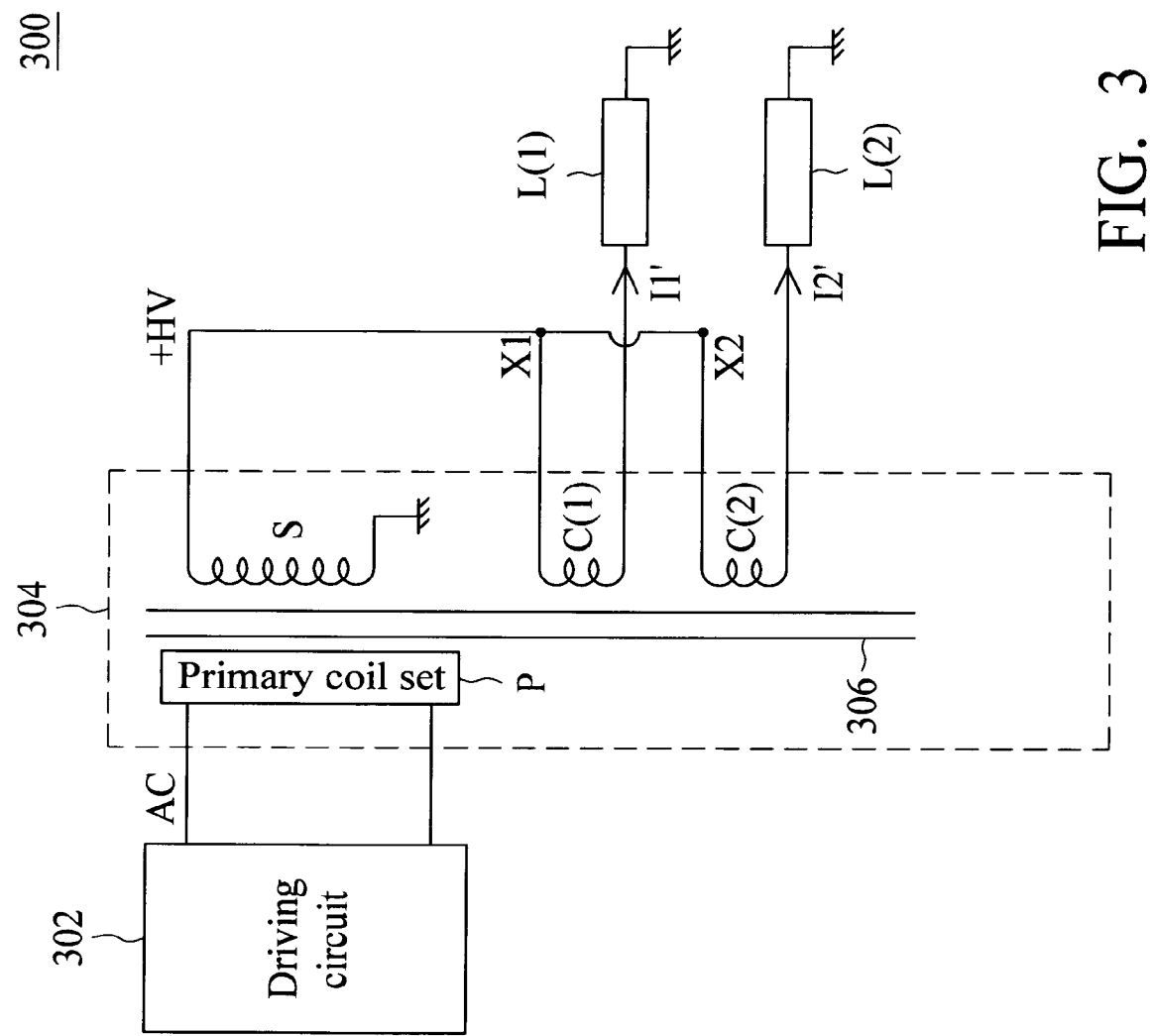
FIG. 3 is a circuit diagram of a power supply circuit according to a second embodiment of the invention.

FIG. 3 is a circuit diagram of a power supply circuit according to a second embodiment of the invention. The power supply circuit 300 drives two lamps L(1) and L(2) for example and includes a driving circuit 302 and a transformer 304. The transformer 304 includes a primary coil set P, a secondary coil S, a first coil C(1), a second coil C(2) and a magnetic core 306. The primary coil set P, the secondary coil S, the first coil C(1) and the second coil C(2) are wound on the magnetic core 306, and the turns of the firs coil C(1) and the second coil C(2) are the same. The first lamp L(1) and the second lamp L(2) are cold-cathode fluorescent lamps (CCFL) or discharging lamps.

The power supply circuit 300 of the second embodiment differs from the power supply circuit 200 of the first embodiment in: the high-voltage output HV of the secondary coil S is coupled to the end X1 of the first coil C(1) and the end X2 of the second coil C(2); the first lamp L(1) is coupled between the first coil C(1) and the ground, and the second lamp L(2) is coupled between the second coil C(2) and the ground. The currents induced by the coil C(1) and C(2) are balanced because the turns of the coils C(1) and C(2) are the same and coils P, S, C(1) and C(2) are wound on the same magnetic core 306. Accordingly, the brightness of the lamps L(1) and L(2) is more even.

As described by the first embodiment, in FIG. 2B-2D, the primary coil set P consists of single coil or multiple coils, and there exists varied combinations of the primary coil set P and the driving circuit 302. It does not matter which combination of the primary coil set P and the driving circuit 302 is, as long as the secondary coil S can output a high alternative voltage required to drive multiple lamps L.

Third Embodiment

Figure 4:
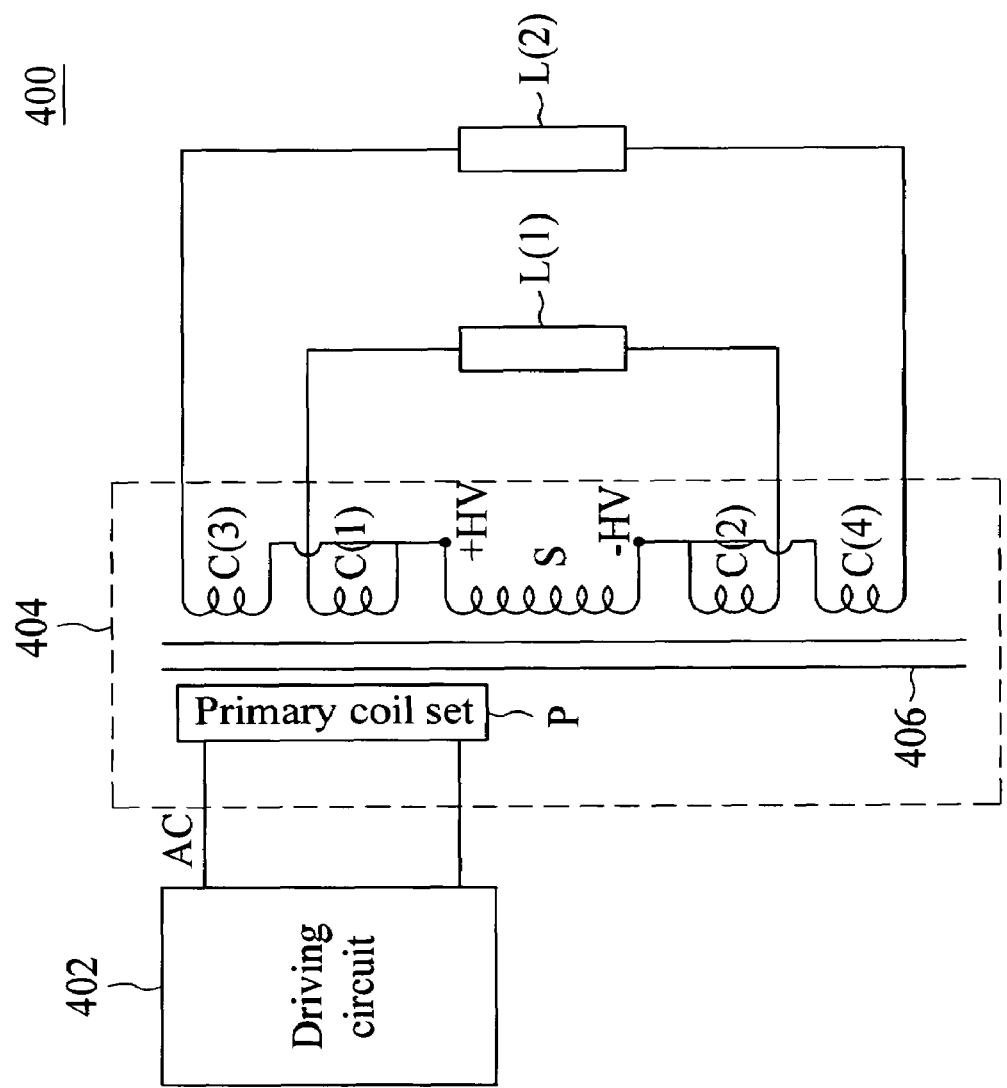
FIG. 4 is a circuit diagram of a power supply circuit according to a third embodiment of the invention.

FIG. 4 is a circuit diagram of a power supply circuit according to a third embodiment of the invention. The power supply circuit in FIG. 4 is suitable for driving lengthier lamps, such as that in the big screen LCD TV. The power supply circuit 400 drives a first lamp L(1) and a second lamp L(2) for example, and includes a driving circuit 402 and a transformer 404. The driving circuit 402 is for example a DC-AC converter or an AC-AC converter for providing an alternative voltage AC to the transformer 404. The transformer 404 includes a primary coil set P, a secondary coil S, a first coil C(1), a second coil C(2), a third coil C(3), a fourth coil C(4) and a magnetic core 406. The primary coil set P, the secondary coil S and the coils C(1)-C(4) are wound on the magnetic core 406, and the turns of the coils C(1)-C(4) are the same. The lamps L(1) and L(2) are cold-cathode fluorescent lamps or discharging lamps.

The secondary coil S has a first end, which is a high voltage end +HV, and a second end, which is a negative high voltage end –HV. The high voltage end +HV connects to one ends of the first coil C(1) and the third coil C(3), and the negative end –HV connects to one ends of the second coil C(2) and the fourth coil C(4). The first lamp L(1) is connected between the other end of the first coil C(1) and the other end of second soil C(2). The second lamp L(2) is connected between the other ends of the third coil C(3) and the fourth coil C(4).

The operation in this embodiment is similar to those in the above embodiments. The current I1" through the first lamp L(1) and the current I2" through the second lamp L(2) are balanced by the coils C(1), C(2) and coils C(3), C(4), respectively, while the high alternative voltage induced by the secondary coil S drives the lamps L(1) and L(2).

Additionally, the primary coil set P can consist of single coil or multiple coils, and there exists multiple combinations of the primary coil set P and the driving circuit 402. It does not matter which combination of the primary coil set P and the driving circuit 402 is, as long as the secondary coil S can output the high alternative voltage required to drive multiple lamps L.

Figure 5A:
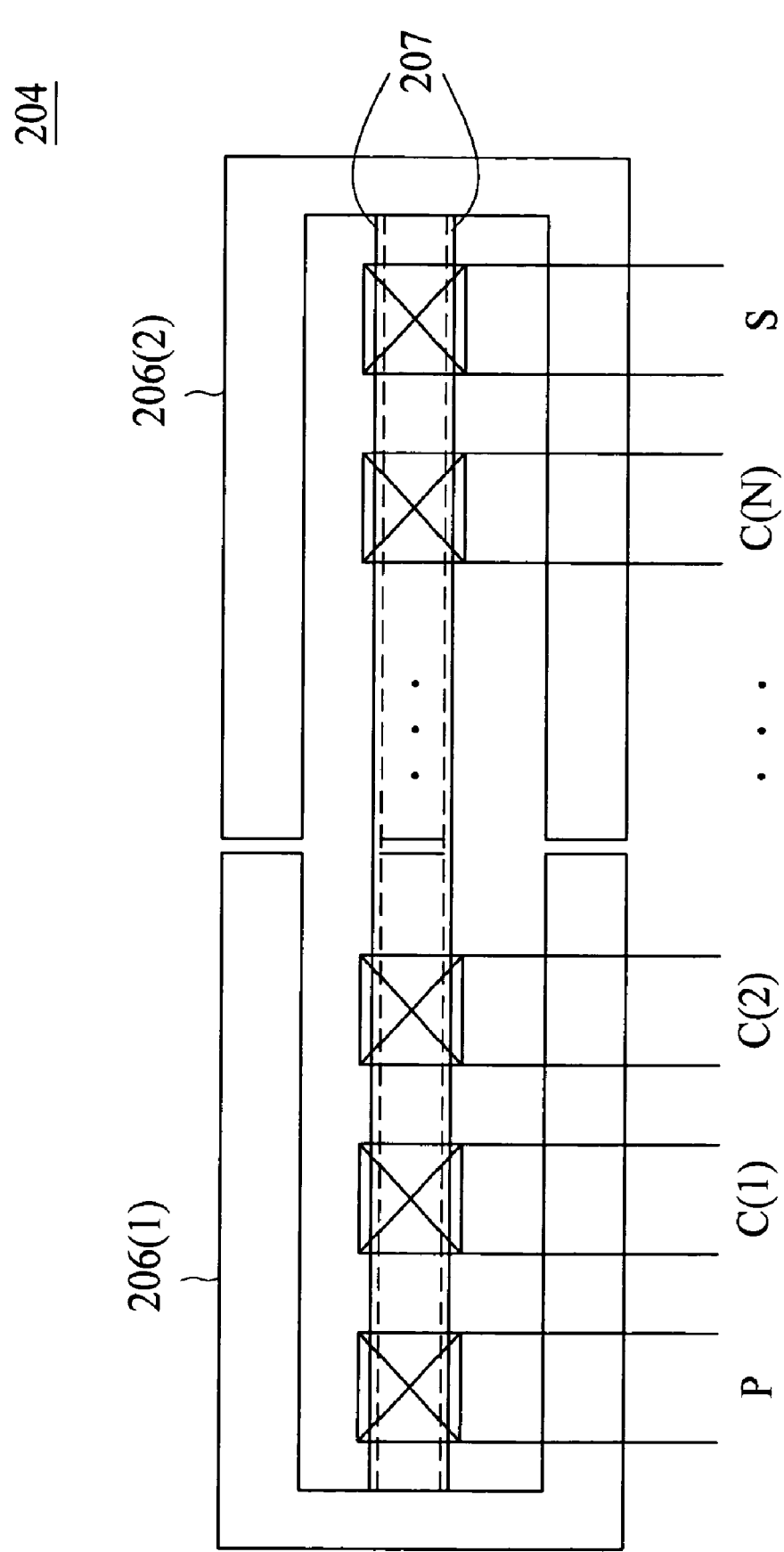
FIG. 5A is a diagram of a transformer of an example A.

FIG. 5A is a diagram of the transformer of an example A. Take the transformer 204 in the first embodiment for example. It does not matter whether the primary coil set P consists of single or multiple coils, and it does not matter where the secondary coil S and the coils C(1)-C(N) are positioned on the magnetic core 206, as long as the insulation between the coils are guaranteed. In FIG. 5A, magnetic core 206 has two E-shape magnetic cores, a first magnetic core 206(1) and a second magnetic core 206(2), respectively. The transformer 204 further includes a frame 207. The three ends of the first magnetic core 206(1) are positioned against the three ends of the second magnetic core 206(2) and the frame 207 is positioned to cover the inner part of the magnetic core 206. The N coils C(1)-C(N), the primary coil set P and the secondary coil S are wound on the frame 207, and the coils C(1)-C(N) are positioned between the primary coil set P and the secondary coil S. The part of the frame 207 that the secondary coil S wound on is of multiple-slot type for solving high voltage issue, as is well-known by the one skilled in the art and would not be repeated here. Additionally, the frame 207 can be replaced with other insulating material such as insulating tapes or epoxy resins.

Figure 5B:
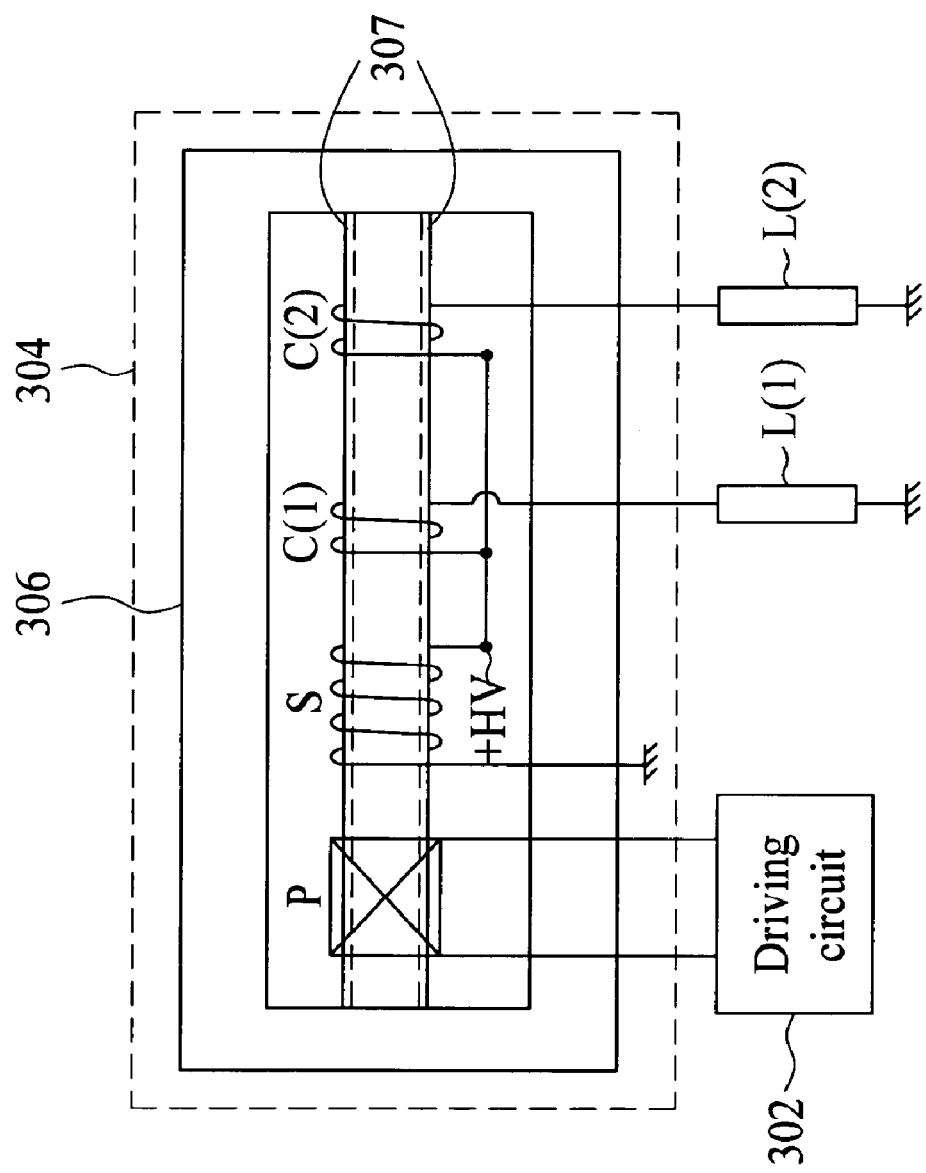
FIG. 5B is a diagram of the power supply circuit of the second embodiment with the transformer of the example A.

Furthermore, the transformer 304 in the second embodiment and the transformer 404 in the third embodiment can use the structure of the transformer shown in FIG. 5A. FIG. 5B is a diagram of the power supply circuit of the second embodiment with the transformer of the example A. The high voltage end +HV is coupled to the end X1 of the first coil C(1) and the end X2 of the second coil C(2) by wire to simplify the circuit board design.

Figure 5C:
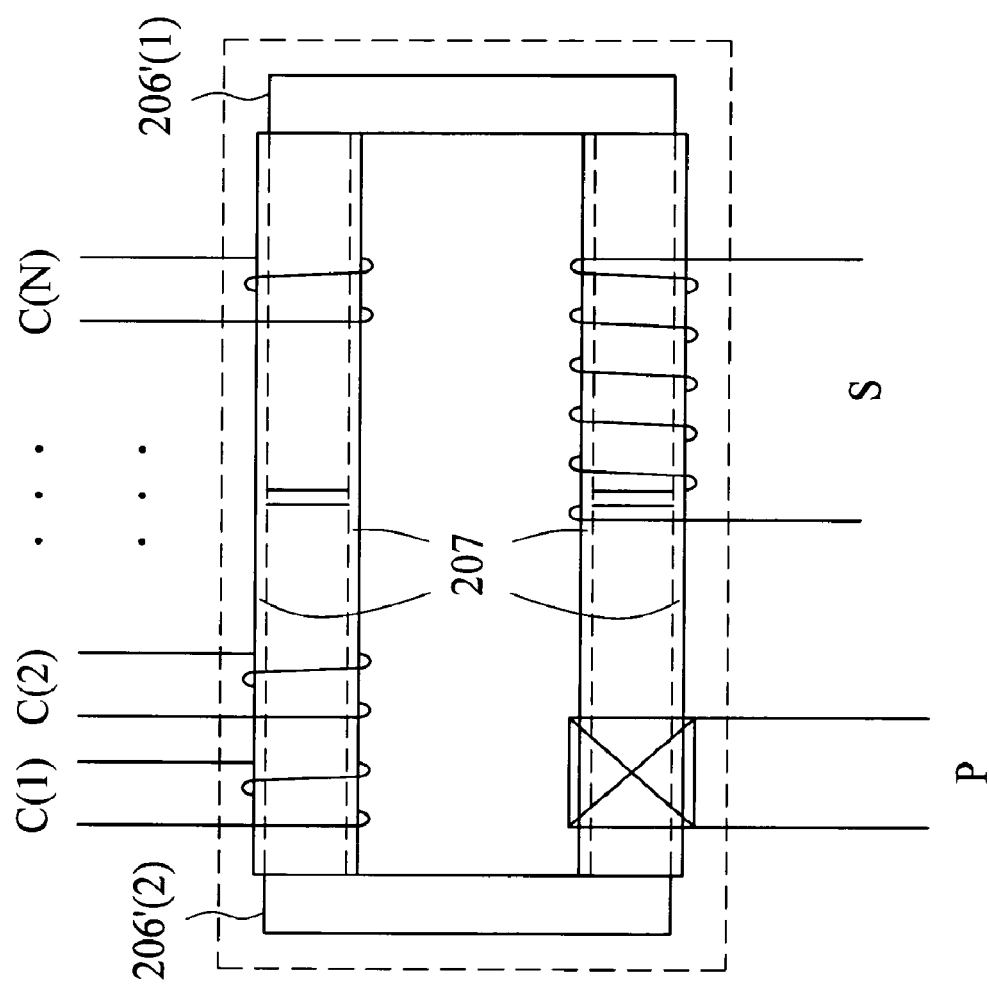
FIG. 5C is a diagram of a transformer of an example B.

FIG. 5C is a diagram of an example B of the transformer. The transformer in FIG. 5C differs from that in FIG. 5A in the positions of the coils P, S, C(1) and C(2), and the shape of the magnetic core. The magnetic core 206' in FIG. 5C consists of two U-shaped magnetic cores 206'(1) and 206'(2) to form a square shape. The primary coil set P and the secondary coil S are positioned on one side of the square-shaped magnetic core 206', along with the coils C(1)-C(N) on the other side. The transformer 304 and 404 in the second and third embodiments can use the structure of the transformer of the example B in FIG. 5C.

Figure 5D:
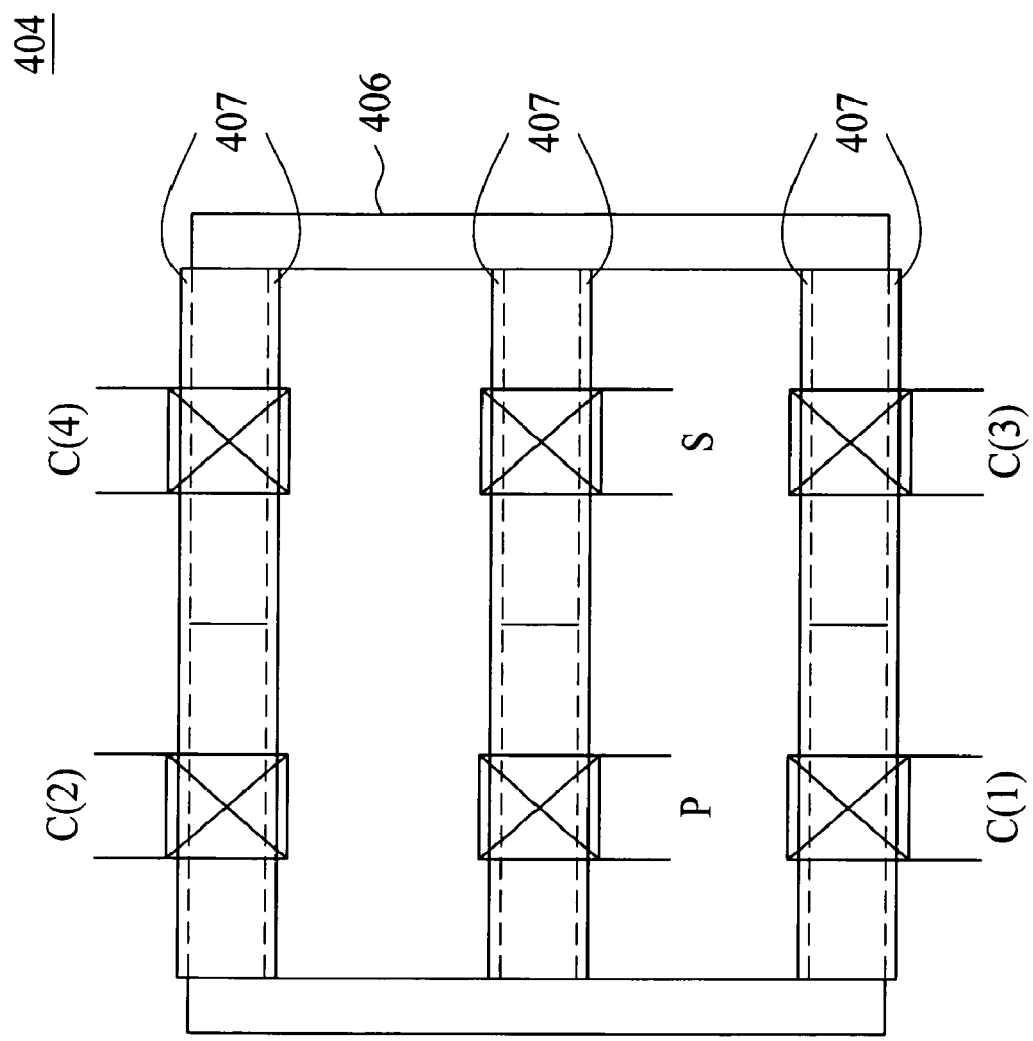
FIG. 5D is a diagram of a transformer of an example C.

FIG. 5D is a diagram of an example C of the transformer. Take the transformer 404 of the third embodiment for example. The voltage across the coil C(1) is similar to that across the coil C(2); the voltage across the coil C(2) is similar to that across the coil C(4). Thus, it is preferably that the first coil C(1) and the third coil C(3) are positioned on one side of the secondary coil S, and that the second coil C(2) and the fourth coil c(4) are positioned on the other side of the secondary coil S. That is, the first coil C(1) and the second coil C(3) are positioned on one outer side of the magnetic core 406, while the second coil C(2) and the fourth coil C(4) are positioned on the other outer side of the magnetic core 406.

Figure 5E:
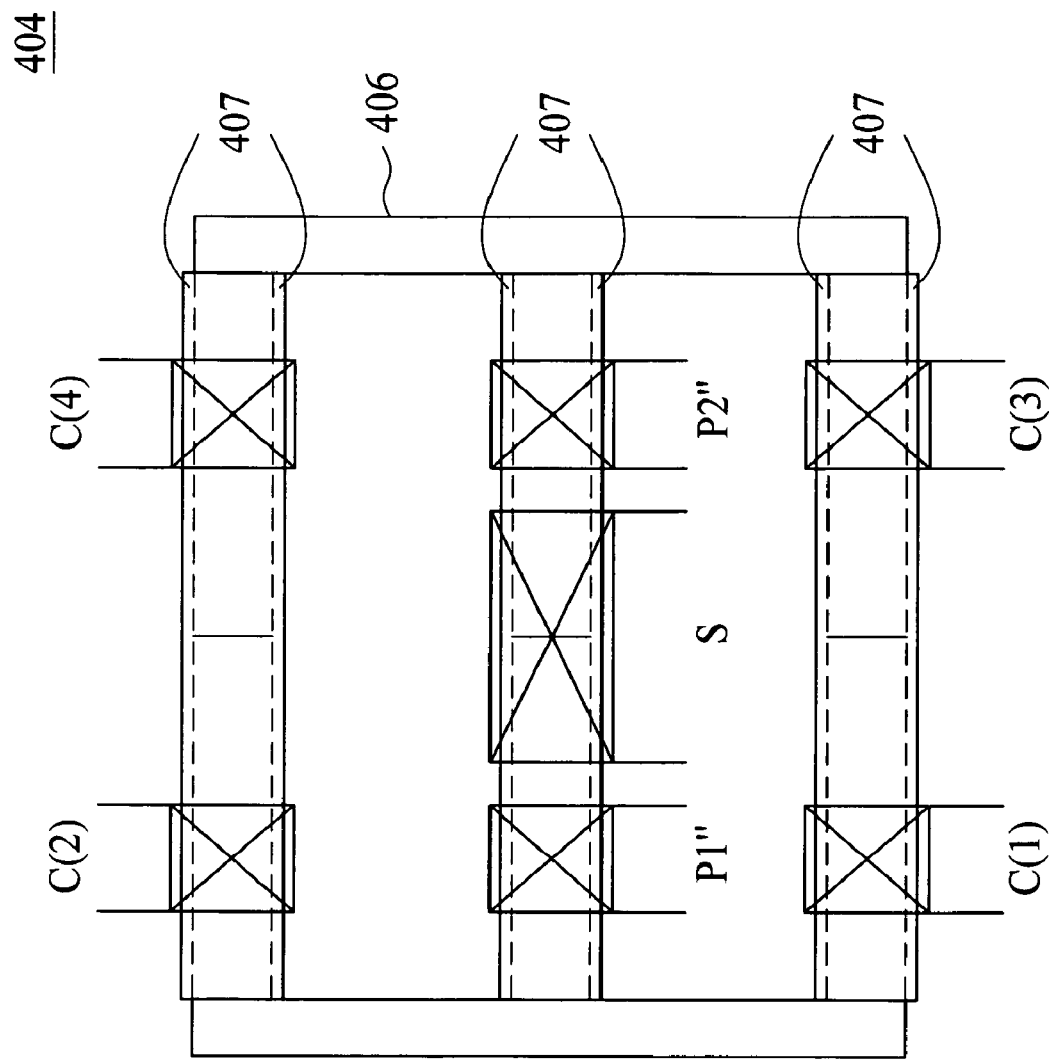
FIG. 5E is a diagram of a transformer of an example D.

FIG. 5E is a diagram of an example D of the transformer. The transformer in FIG. 5E differs from that in FIG. 5C in that the primary coil set P consists of two primary coils P1" and P2" connected in series or independently and respectively positioned at the two side of the secondary coil S.

The power supply circuit for lamps and the transformer thereof of the embodiments has one lamp correspond to one coil C regardless of the structure of the transformer. The coils C are wound on the same magnetic core and the turns thereof are the same. The primary coil set and the secondary coil are wound on the same magnetic core either. By the same magnetic path of the coils, the currents through the lamps are closer to solve the issue of unbalanced currents while driving multiple lamps.

While the invention has been described by way of examples and in terms of preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A power supply circuit for a first lamp and a second lamp, the power supply circuit comprising:
    a driving circuit for outputting an alternative voltage;
    and a transformer receiving the alternative voltage for driving the first lamp and the second lamp, the transformer comprising:
        a magnetic core; a primary coil set wound on the magnetic core and coupled to the driving circuit for receiving the alternative voltage;
        a primary coil set wound on the magnetic core and coupled to the driving circuit for receiving the alternating voltage
        a secondary coil wound on the magnetic core and having a positive high voltage end and a negative high voltage end; and
        a first coil, a second coil, a third and a fourth coil, all wound on the magnetic core, and the turns thereof being equal;
    wherein the positive high voltage end is coupled to one ends of the first and the third coils in parallel, the negative high voltage end is coupled to one ends of the second coil and the fourth coil in parallel, the first lamp is coupled between the other ends of the first and the second coils, and the second lamp is coupled between the other ends of the third and fourth coils respectively.

2. The power supply circuit according to claim 1, wherein the first coil and the third coil are positioned on one side of the secondary coil, and the second coil and the fourth coil are positioned on the other side of the secondary coil.

3. The power supply circuit according to claim 1, wherein the primary coil set comprising single or a plurality of coils.

4. A transformer for driving a plurality of lamps, the transformer comprising:
    a magnetic core;
    a primary coil set wound on the magnetic core;
    a secondary coil wound on the magnetic core for driving the lamps, having a first end and a second end; and
    a first coil, a second coil, a third and a fourth coil, all wound on the magnetic core, and the turns thereof being substantially equal, the first end is coupled to the first coil and the third coil in parallel, the second end is coupled to the second coil and the fourth end in parallel.

5. The transformer according to claim 4, wherein the first coil and the third coil are positioned on one side of the secondary coil, and the second coil and the fourth coil are positioned on the other side of the secondary coil.

* * * * *